(12) United States Patent
Beale et al.

(10) Patent No.: US 6,196,370 B1
(45) Date of Patent: Mar. 6, 2001

(54) PACKAGE CONVEYING SURFACE WITH LINER

(75) Inventors: Scott Andrew Beale, Clifton Park, NY (US); James Michael Ritter, Bennington, VT (US)

(73) Assignee: Tonoga Limited, Petersburgh, NY (US)

( * ) Notice: Subject to any disclaimer, the term of this patent is extended or adjusted under 35 U.S.C. 154(b) by 0 days.

(21) Appl. No.: 09/049,817

(22) Filed: Mar. 27, 1998

(51) Int. Cl.$^7$ .......................... B65G 11/00; B65G 13/00
(52) U.S. Cl. ................ 193/2 R; 193/22; 193/37
(58) Field of Search ................ 193/2 R, 22, 37, 193/38

(56) References Cited

U.S. PATENT DOCUMENTS

| | | | |
|---|---|---|---|
| 3,566,501 | 3/1971 | Winchester | 29/157.3 |
| 3,598,460 | * 8/1971 | Conrath | 308/238 X |
| 3,787,281 | 1/1974 | Effenberger | 161/188 |
| 4,234,182 | * 11/1980 | Camilleri | 193/2 R X |
| 4,328,957 | * 5/1982 | LaBate | 193/2 R X |
| 4,362,231 | * 12/1982 | Meyer | 193/2 R |
| 4,529,660 | * 7/1985 | Heim | 193/2 R X |
| 4,645,055 | * 2/1987 | Griese et al. | 193/2 R |
| 4,796,887 | * 1/1989 | Sternhagen | 193/2 R X |
| 5,230,937 | 7/1993 | Effenberger et al. | 428/113 |
| 6,015,606 | * 1/2000 | Abe | 428/214 |
| 6,017,624 | * 1/2000 | Delgado et al. | 428/355 AC |

FOREIGN PATENT DOCUMENTS

| | | |
|---|---|---|
| 3633036 A1 | 3/1988 | (DE) . |
| 3905343A2 | 2/1989 | (DE) . |
| 4219636A1 | 12/1993 | (DE) . |
| 0 479 592 A2 | 8/1992 | (EP) . |

* cited by examiner

*Primary Examiner*—Christopher P. Ellis
*Assistant Examiner*—Gene O. Crawford
(74) *Attorney, Agent, or Firm*—Heslin & Rothenberg, P.C.

(57) ABSTRACT

A chute for supporting and facilitating transport of packages has a skived PTFE film adhesively bonded to a transport substrate. A pressure sensitive adhesive is pre-formed on and bonded to an entire surface of a first side of said skived PTFE film. Prior to installation, a release liner covers the adhesive. After the release liner is removed, the skived PTFE film with the pre-formed adhesive is attached to the substrate through the application of pressure to an opposite side of the film. The exposed opposite side of the film provides a lubricious transport surface on which packages move continuously without build-up. The film has a thickness which accommodates significant abrasion wear over time while continuing to provide a lubricious transport surface. The skived PTFE film may contain a carbon filler to prevent static electric build-up. The film can be applied over the whole transport substrate or only to wear paths.

30 Claims, 4 Drawing Sheets

PACKAGE CONVEYING SURFACE WITH LINER

BACKGROUND OF THE INVENTION

1. Field of Invention

This invention relates to an apparatus used to transport, convey, or move various objects, such as packages, from one location to another; and, more particularly, to coatings or liners for the surfaces on which the objects are transported, conveyed or moved; and a method of applying such coating or liner to such surface.

2. Description of the Prior Art

In the package shipping industry, the package is processed for trans-shipment using a stationary chute where the package is caused to be moved along by an external force, such as gravity. The chute may come in various sizes and shapes, such as an inclined slide with a stopper wall or horizontal plane at the bottom thereof, a spiral channel going from one floor to another, a circular angled flat surface, etc. The term "chute" is defined elsewhere herein. Almost every package shipping and processing station has one or more chutes which are used in the processing of the packages.

The most troublesome problem in the package shipping industry has been the continual pile-up or build-up of the packages in the chutes. The packages inevitably tend to stick and/or bridge, and cause a back-up of the packages and a shut down of the conveying line. This problem may be caused most often by defective design of the chutes as well as by such factors as humidity (e.g. the packages are wet) and the condition and/or composition of the packages (e.g. "shrink wrapped" plastic coating). There is poor compatibility between the chute surface and the packages. But, due to cost and other considerations, there has been very little change in the structural design of the chutes. Thus, in the prior art, the problem of package build-up, bridging, sticking, back-up, and the like, has been approached in an ad hoc manner as to solutions for such problem. Some of these approaches are as follows, none of which are satisfactory.

The most obvious solution and which has been the most expensive has been for the operator to stop the transporting line, and then go to the chute location where there is bridging, etc, and using a pole or other ad hoc tool, knock the packages around until the back-up problem is solved. Unfortunately, many of the problems occur in hard to reach places. Thus, the human operator is often injured while trying to solve the problem. This increases considerably the Workman's Compensation rate, injury to the worker, and conveying line down time. Also, recent tightening of OSHA rules makes this solution outdated. In other words, this ad hoc solution is no longer feasible.

Also, when the packages are "wet" or "shrink wrapped", the transport surface of the chute was sprayed or painted with graphite paint or paraffin wax partially diluted with water. However, this solution was not satisfactory because of the costs involved and because of the contamination caused to other packages and other parts of the conveying system, such as to moving conveyor belts which would become coated with the wax and/or graphite and require frequent and costly replacement. Also, this solution is really no solution since the wax and/or graphite would be effective at most for only a day or so because most of the coating would tend to stick to the package and be taken away thereby. In this type of solution, we can also include use of oils and other similar material, which also have the same problem.

Another solution attempted in the prior art was covering the transporting surface with a sheet of UHMW (ultra high molecular weight) polyethylene. Although the polyethylene layer appears to be "slick", in point of fact, it is inherently non-stack in effect. The material tends to abrade in a manner similar to a sheet of plywood which may sliver and itself thereby cause the packages to bridge and stick. Once abraded, the UHMW polyethylene layer's coefficient of friction and surface energy will begin to have an adverse effect on movement of the package placed on its surface. Also, disadvantageously, the process of applying this UHMW layer is time consuming because it must be cut, bevelled, drilled, and countersunk with screws. The cost of installation is thus almost prohibitive. Accordingly, this solution is not satisfactory.

A further solution was recently suggested, but was found to have too many disadvantages to be economically feasible. This was to make the chutes of molded fiber glass with a high build epoxy coating on the conveying surfaces. It was discovered that such chutes factured easily, were difficult to repair, were of brittle material, and had inadequate release properties. Thus, rather than solve the problem of build up, this type of chute caused almost the same problem of build-up and accordingly, the problem was not solved satisfactorily.

Thus, the prior art had not yet satisfactorily resolved the problem of package buildup, bridging, sticking, etc., in chutes.

SUMMARY OF THE INVENTION

Accordingly, an object of the invention is to overcome the aforementioned and other problems, deficiencies, and disadvantages of the prior art.

Another object is to provide a chute for transmission, transport, conveying or moving objects, such as packages, wherein the transport surface (which may otherwise be called "substrate" before installation of the coating or liner) of the chute has been coated or attached thereto a liner comprising a skived PTFE film or layer ("PTFE" is otherwise known as polytetrafluoroethylene, and to the layman, such composition may also be known as TEFLON in various forms). The term "PTFE film or layer" includes polymerized and/or copolymerized tetrafluoroethylene. Also, the transport surface or substrate may be flat or textured.

Another object is to provide such a chute wherein both the horizontal and non-horizontal surfaces are coated with or has attached thereto a liner comprising a skived PTFE film or layer.

A further object is to attach the skived PTFE film or layer to the transport substrate by use of a pressure sensitive acrylic adhesive which substantially intimately bonds the film to the substrate, so that the substrate and film act as a unitary structure in holding and moving packages in a non-stick manner.

Another object is to provide a chute wherein the surface contaminants are first mechanically removed, then cleaned with use of a non-soap, non-surfactant cleaner, then, rinsed, dried and then, the skived PTFE film is bonded to the chute surface with use of an adhesive, most preferably an acrylic adhesive, wherein the adhesive is applied by use of pressure on the PTFE film.

A further object is to provide a chute wherein "high spots" in the transport substrate or surface are smoothed and the PTFE film is attached to the surface or substrate surrounding the "high spots".

Another object is to provide a method of applying a liner comprising a skived PTFE film or layer onto a transport surface of a chute used to convey packages, wherein the surface is first prepared to smooth and clean the surface, and then cleaned with a non-soap, non-surfactant cleaner, then, rinsed, and then dried, and then, a pre-cut strip of skived PTFE film having a pressure sensitive adhesive layer bonded thereto is attached to the surface of the chute with the adhesive layer wherein the strip has its longitudinal direction disposed to be parallel to the direction of travel of the packages.

A further object is to provide a diamond shaped piece of PTFE film or layer in repairing damaged areas of priorly installed PTFE film on transport surface.

A still further object is to burnish edges of adjacent strips of PTFE films having a gap therebetween to thereby reduce the gap distance.

Another object is to sandpaper edges of the PTFE film to create gradual surfaces thereof and prevent "catching" of the edges by the packages traveling on the PTFE film surface.

A still further object is to provide a method of applying a skived PTFE film or layer to a chute surface or substrate, wherein the skived film or layer of PTFE having a reverse surface thereof coated with an acrylic or other adhesive is exposed gradually along its width dimension and pressed agaist the surface or substrate to affix the film or layer onto the surface or substrate, and then, gradually more of the adhesive backed strip is exposed to forceably bond the adhesive to the substrate and thereby efficiently and reliably bond the skived PTFE film or layer onto the surface or substrate.

A further object is to provide a method of taking a skived PTFE film or layer and causing one surface thereof to become etched or carbonized, and then, applying to the entire one surface an adhesive, most preferably an acrylic adhesive, and then, after a transport substrate is smoothed, cleaned, and dried, applying the adhesive coating to the substrate so as to bond the skived PTFE film or layer to the substrate so that the combined structure acts as a single structure to effectively convey packages without build-up, bridging or sticking.

Another object is to provide a chute wherein the transport surface or substrate has bonded thereto a skived PTFE film having a thickness of between 5 to 15 mils, most preferably 10 mils, and an acrylic adhesive layer of between 0.5 to 5 mils, most preferably 2 mils, wherein the film has an elongation break factor of 200%, and wherein the width ranges from 5 to 38 inches, with the length as desired.

A further object is to provide a chute wherein the skived PTFE film is bonded to the substrate surface at least to areas within the wear path caused by packages moving thereon.

DETAILED DESCRIPTION OF THE PREFERRED EMBODIMENTS

Figure 1:
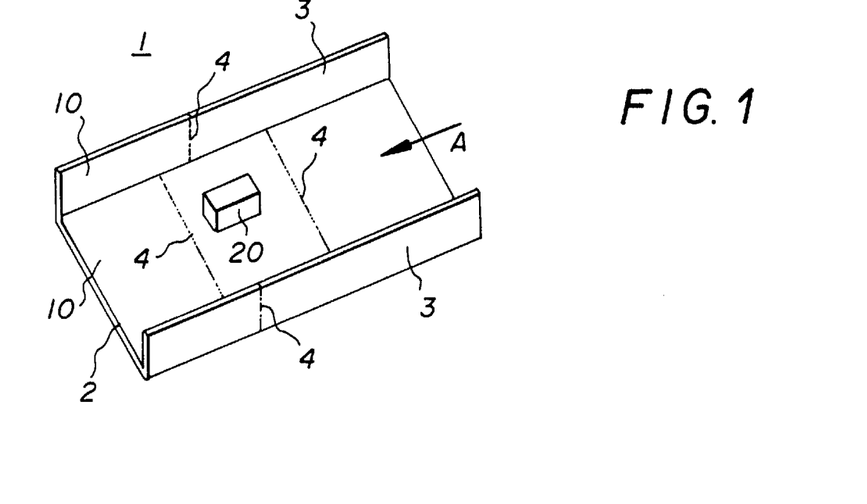
FIG. 1 is a perspective view depicting an illustrative embodiment of the invention encompassing a chute package transport surface.
Figure 2:
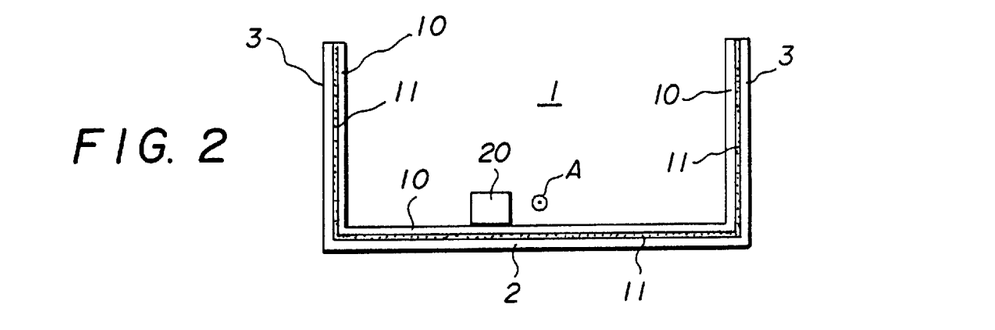
FIG. 2 is a front elevational view of the embodiment of FIG. 1.
Figure 3:
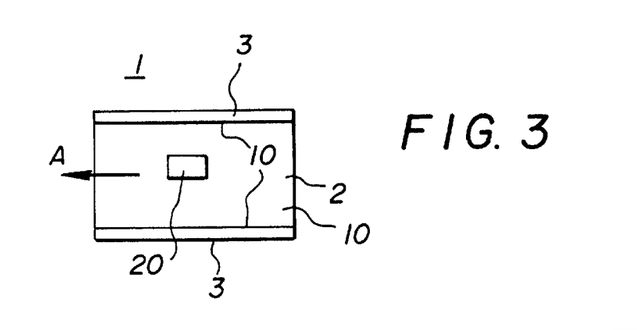
FIG. 3 is a top view of the embodiment of FIG. 1.

Turning now to FIGS. 1, 2 and 3, a stationary chute 1 comprises, for example, a float transporting surface or substrate 2 and a pair of side walls or panels 3 disposed generally perpendicular to the flat transport surface 2. The chute may be made of a suitable material which may be metallic or non-metallic, such as cold rolled steel, galvanized steel, aluminum, wood, wood fiber composition, plastic, fiberglass with epoxy coating, etc, and comprises usually a plurality of panels which are welded or otherwise connected together. Most of the chutes used in the package shipping industry are made of steel, and the component panels are usually welded together, although some are formed by interconnecting joints. The interconnections, such as welds, are shown with lines 4 in FIG. 1. In the package shipping industry, the stationary chutes are used to hold and move the packages 20 from one station or location to another, such as in the direction shown by arrow A, by force of gravity or movement of the packagers through application of an outside force. The invention is directed preferably to stationary chutes wherein the packages are moved by an outside force such as gravity.

Figure 4:
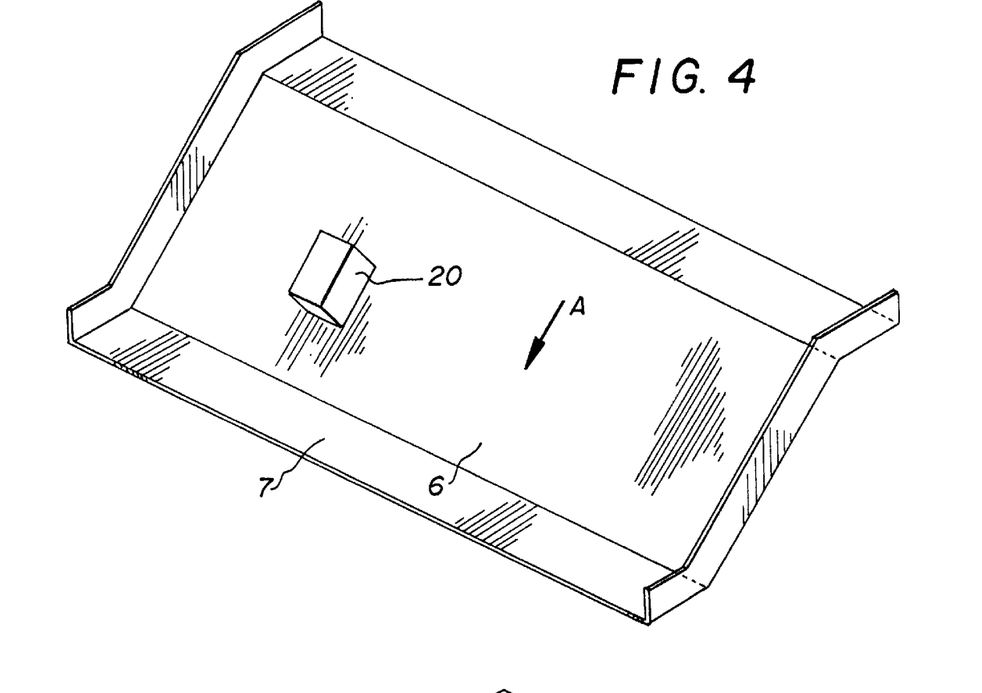
FIG. 4 is a perspective view of another illustrative embodiment of the invention encompassing an inclined slide package transport surface.

The chutes may comprise any number of shapes, sizes, and styles and this invention is intended to cover all such chutes which are stationary in function. The chutes may comprise, for example, a slide type which is shown in FIG. 4, wherein the slide comprises an inclined sliding surface 6 on which packages 20 are placed and caused by force of gravity to travel down the inclined surface and caused to stop at the bottom thereof by a horizontal surface 7 disposed thereat.

Figure 5:
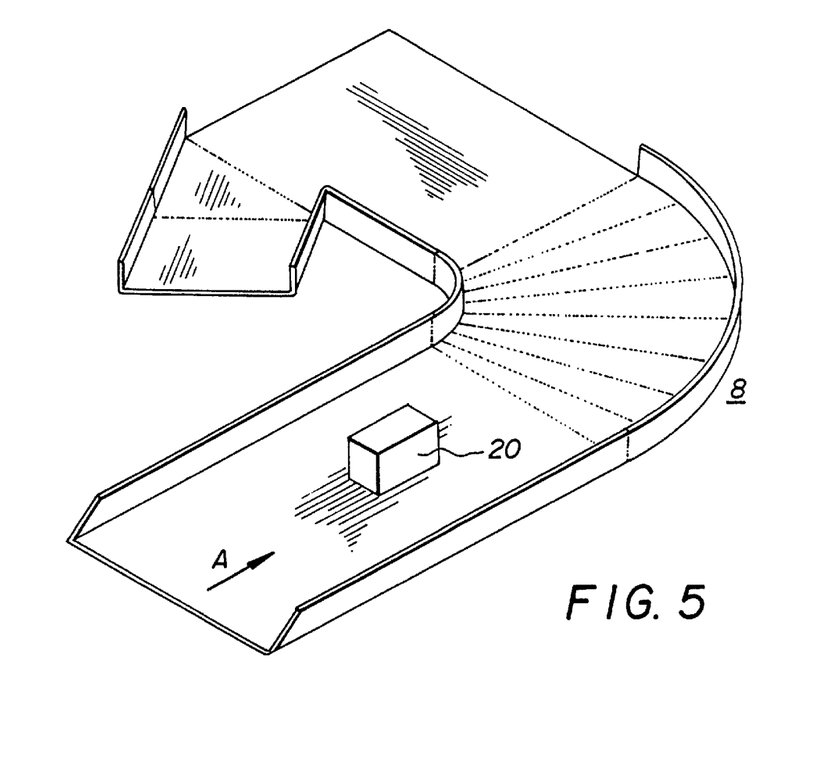
FIG. 5 is a perspective view of a circular chute embodying the invention.
Figure 6:
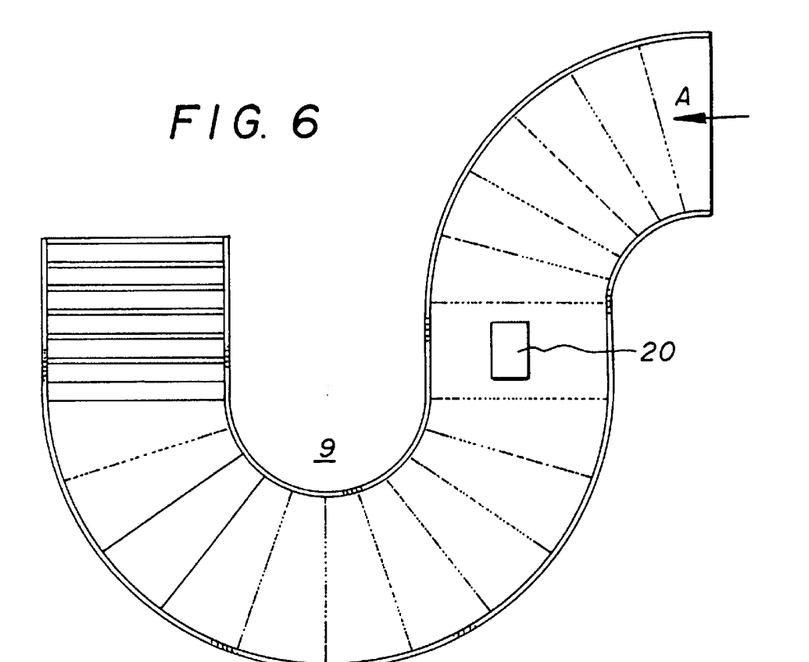
FIG. 6 is a top view depicting a spiral type chute embodying the invention.

Another example of a stationary chute which is covered by the invention is a curved shaped chute 8 shown in FIG. 5. Also, a further example is shown as a spiral shaped chute 9 in FIG. 6. The spiral shaped chute of FIG. 6 maybe used to transport packages from one vertical level to another.

The term "chute" as used herein is intended to cover all types, styles, shapes and forms of stationary transport surfaces or substrates on which objects, such as a plurality of packages, are transferred, transported, transmitted, conveyed or otherwise moved from one location to another by an outside force, such as gravity. The surfaces may be flat, textured, curved, inclined or of any desired shape and be combined with or without side walls. The surface also include all types of shapes and angular orientations, such as rectangular, square, curved, trapezoidal, spiral, and may be horizontal, vertical, or of any desired angle. The chutes may also be made of any desired material, such as those listed above. The material currently in use is steel and the interconnections are welds or joints. It has been discovered by the inventors that for steel substrates, an acrylic adhesive used as a backing for a skived PTFE film or layer is especially effective in bonding the PTFE film to the steel substrate.

The chutes are disposed to be stationary with the transport surface being disposed to be horizontal or at an angle so that an external force, such as gravity, will cause the package 20 (in FIG. 1) placed on the transport surface to be moved in the travel direction, shown by arrow "A" in FIG. 1. The packages may be pushed one after another by a pushing force. The invention covers all types of such transport surface or substrate which is stationary and on which packages are held and moved by the external force. The terms "transfer", "transmit", "transport", "convey", "move" together with the terms "surface" or "substrate", "liner" and the like are used interchangeably to mean the stationary surface on which the objects are disposed and caused to move from one location to another.

Figure 11:
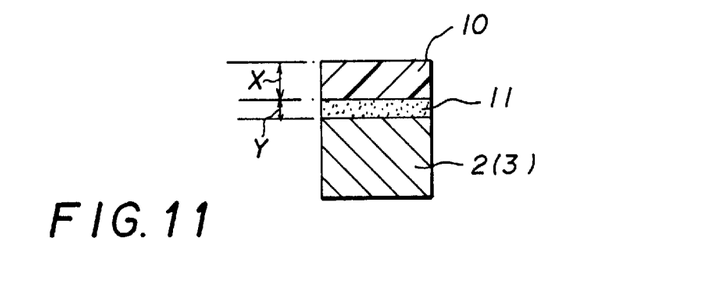
FIG. 11 shows a cross-sectional view of a part of the transport surface having the attached PTFE liner.

As shown in FIG. 2 and in an expanded view in FIG. 11, the surface 2 and side walls 3 are coated or line with or has attached thereto or bonded thereto, a layer 10 of skived PTFE film or layer with use of an adhesive, such as an acrylic adhesive 11 bonding the film to the surface. Advantageously, film 10 is intimately bonded to the adhesive 11, which in turn is intimately bonded to surface 2.

The skived PTFE film or layer 10, labeled "X" in FIG. 11, is of a thickness of between 5 to 15 mils, and most preferably 10 mils, and adhesive layer 11, labeled "Y" in FIG. 11, is of a thickness of between 0.5 to 5 mils, and most preferably 2 mils. The lower limit of the film 10 is set to 5 mils because a thinner thickness would not be effective for a sufficient time due to rapid abrasion to make the liner economical. The upper limit of 15 mils is set because the thicknesses in excess thereof will not be economical and furthermore the installation of the film would tend to become cumbersome. As for the lower thickness limit of the adhesive, below 0.5 mils thickness would not be sufficiently effective in bonding the film to the substate. Above 5 mils would be uneconomical and excess thereof would not add any more "tackiness" in bonding the film to the substrate. The preferred thickness of the film 10 is 10 mils in terms of economy, ease of installation and permanence of liner bonded to the substrate. Also, the optimal amount of adhesive of 2 mils is most economical combined with the desired degree of "tackiness".

The thickness of film 10 should be sufficient to allow for abrasion wear over time by the contact of the film with packages moved thereover. As mentioned, it has been found that the PTFE covered transport surface can abrade from 50 to 60 percent and still maintain operational integrity and effectiveness, that is, prevent build-up, bridging, sticking, and the like of the packages moved thereover.

Also, the use of 2 mils thickness of a specific adhesive, namely, an acrylic adhesive was found to be especially effective in providing continued "tackiness" over a long period of time, and was not subject to creep when larger packages unevenly pushed the PTFE layer at concentrated spots.

The skived PTFE film bonded to the transport surface is in sheet form, that is a film, and has the property of offering a lubricious, non-stick surface. It is "soft" and will abrade over a period of time. But, it was discovered by the inventors that the skived PTFE film 10 when attached to substrate 2 by use of the acrylic adhesive over the entire area of the liner could be abraded by the above mentioned 50 to 60% in area and still be operationally effective in preventing package build-up. Hence, a feature of the invention is that the entire surface area of the skived PTFE film and transport surface be completely covered where the two coincide with the adhesive without any air bubbles or wrinkles in the film. That is to say, where the skived film is attached to the substrate, there exists the adhesive bonding the two together without any air pockets or wrinkles where adhesive does not exist.

The term "PTFE" includes various forms of polymerized or copolymerized tetrafluoroethylene, and more preferably polytetrafluoroethylene. It includes various forms of PTFE in a pure form or combined with a filler. The term "skived" refers to the process of forming the particular type of PTFE film or layer, wherein the PTFE or PTFE combined with filler is subjected to slicing in thin layers. The term "film" or "layer" is used herein to mean of the thickness herein define.

A further feature of the invention is the use of a carbon filler in the PTFE. The amount of carbon filler may range from 0.1 to 1.0 percent by weight of the PTFE. It has been discovered by the inventors that the use of a carbon filler in the skived PTFE film or layer prevents static electricity from building up in the chutes. This is desirable when the packages comprise plastic material or plastic coatings. The lower limit of 0.1 weight percent is set because lower amounts do not seem to be sufficient to prevent static electric build-up. Above the limit of 1.0 weight percent is without further effect in preventing static electric build up, and would be a waste of filler, and increase cost without increased benefit.

The skived PTFE film or layer used in the invention is available on the market and comes in various widths and lengths and is usually rolled. In this invention, because of the manner and extent of the installation, it is preferred that the width thereof range from 5 to 38 inches, with the most preferred width being 18 inches. The lower limit of width is set because for most installations to cover the package shipping chute as a liner therefor, smaller widths would be too expensive in terms of labor for installation, transporting, and placement of adhesive thereon. Widths wider than 38 inches cause problems in adherence of the adhesive, the use of uniform pressure when installing the full width, and causing air bubbles and wrinking in the installed sheets of skived PTFE film. The preferred width of 18 inches was found to be optimal in terms of ease of installation, reliability of setting, and elimination of air bubbles and wrinkles. The length of the film may be without limit depending on use with the preferred length being between 12 to 200 inches. For certain uses, such as for installation of the film on a large scale, a larger and wider piece can be used.

The skived PTFE film or layer used in the invention is a virgin, skived polymerized or copolymerized tetrafluoroethylene material having an operational temperature of −40 to +350° F. The most preferred material is a skived PTFE film or layer. The film or layer is available in various thicknesses, widths, and lengths as desired.

A feature of the invention is taking the already skived PTFE films of desired widths, thicknesses, and lengths and then adding the adhesive, such as acrylic, silicone, natural and synthetic rubber, and the like with acrylic being most preferred, to one surface thereof in the manner set forth herein. An important feature of the invention is the bonding of the skived PTFE film onto the transport surface of the chute so that the two act as a unitary structure in conveying packages without buildup, bridging or sticking. Accordingly, it is important that the adhesive be of suitable "tackiness" and strength and be readily workable when the PTFE film is bonded to the transport surface. As discussed herein in greater detail, we have discovered that the acrylic adhesive is especially suited for this purpose where the PTFE film is lined on the transport surface of the chute. It is important that the acrylic or other adhesive be intimately bonded to one surface of the PTFE film or layer.

Accordingly, the skived PTFE film is first etched or otherwise carbonized to expose cross-linking molecules to which the adhesive is then attached throughout the entire surface of one side of the skived PTFE film. The surface of the PTFE film may be prepared by use of an etchant, such as sodium-ammonia etchant, or sodium-nathalene etchant. Another method involves use of a colloidal silica mixed with a polymerized or copolymerized TFE dispersion and coated onto the PTFE film. A further method involves a Corona treatment.

After such treatment, the adhesive is uniformly covered over the prepared surface of the skived PTFE film, such as by use of a blade or similar tool. Then, on top of the layer of adhesive, a release liner, such as polyethylene layer, is added so that the adhesive will not inadvertently adhere to an unwanted surface during storage, transport or installation. It is to be understood that the covering of the skived PTFE film on one side thereof with the adhesive after etching or other preparation of the one surface, is an important feature of the invention. Also, advantageously, the arrangement is pressure sensitive so that application of pressure to the PTFE film attaches the film to the substrate in an intimate bonding.

As stated before, the operating temperature ranges from −40 to +350° F. which is suitable for most uses. The installation of the film with adhesive on the chute surface should be done at a temperature of no less than 30° F. for best results. Below such temperature, the adhesive will not stick properly to the surface.

After the release liner is placed on top of the adhesive, the entire PTFE film, adhesive and release liner are rolled for convenience of handling, transport, and installation. When the skived PTFE film, adhesive and release liner are rolled, because of the memory properties of the PTFE, there is a tendency of the film to continue to be rolled so that the film will curl up again in the same manner as previously rolled. It was discovered by the inventors that best results in installation were obtained by first unrolling the film, adhesive and release liner, and then reverse rolling the film, adhesive and release liner, prior to installation. By such reverse rolling, it was discovered that attachment of the adhesive and film was enhanced with the film having just the right amount of curl to aid installation. Thus, with such reverse rolling, installation was made more efficient, less time consuming, and resulted in increased accuracy of installation and increased reliability. Although this reverse rolling may seem simple, the importance of such step cannot be overlooked because of the advantages gained by such reverse rolling.

Although acrylic adhesive is preferred, where specifications are looser, consideration may be given to other types of adhesives, such as silicone adhesive, natural rubber adhesive, synthetic rubber adhesive, and the like. But, such other adhesives may tend to increase bunching of the PTFE film due to reduced "tackiness" of the other adhesives. Advantageously, the acrylic adhesive has an excellent "tackiness" and when bonded to one surface of the skived PTFE film, has an excellent "tackiness" to the substrate and provides excellent bonding between the film and substrate. Also, advantageously, the acrylic adhesive has an almost indefinite shelf life and its adhesive value does not deteriorate with time as do many other types of adhesives.

An important property of the installed skived PTFE film or layer is its lubricious, non-stick property. Thus, packages placed and moved on the chute lined with the PTFE liner move more easily whether under force of gravity or other motive power, without causing any build-up, bridging, or sticking. The invention incorporates the skived PTFE film or layer onto the transport surface or substrate with use of the acrylic adhesive.

The installation of the PTFE liner onto the transport surface or substrate is done according to the following procedure.

Figure 7:
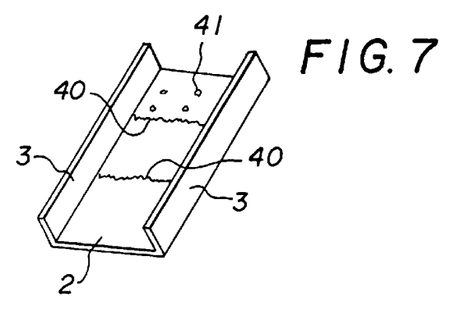
FIG. 7 is a perspective view depicting a chute prior to preparation of the transport surface.
Figure 8:
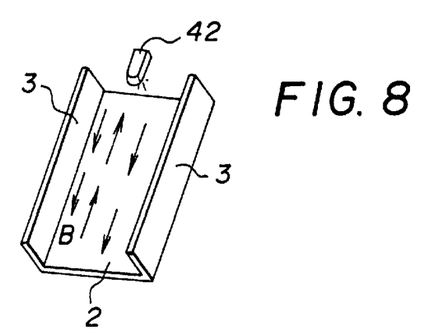
FIG. 8 is a perspective view depicting the embodiment of FIG. 7 showing the cleaning step.
Figure 9:
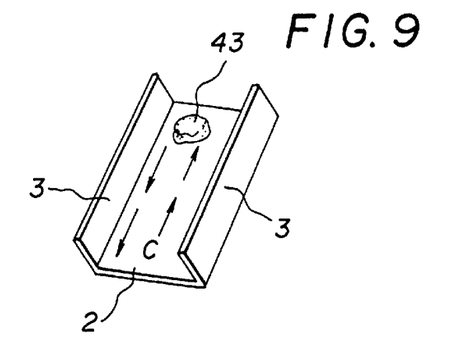
FIG. 9 is a perspective view depicting the embodiment of FIG. 7 and showing a further rinsing step.

PREPARATION OF THE TRANSPORT SURFACE (FIGS. 7–9)

As shown in FIG. 7, all of the contaminants 40,41 on the transport substrate 2, and walls 3, such as welds, breaks, joints, rust, paint, etc, are repaired and/or mechanically prepared, such as by use of a scraper, grinder, sander, etc, until the surface is smooth. The "high spots", which will be discussed in detail in connection with FIG. 14, should be smoothed although not necessarily to the same level as the remainder of the surface.

The entire surface to be lined and the adjacent surfaces are then vacuumed from top or leading end to bottom or trailing end to remove loose contaminants.

Then, as shown in FIG. 8, the smoothed surface is cleaned. From the top or leading end of the chute and working downward toward the trailing end, the chute surfaces 2 and 3 are wiped down using tool and cleaner container 42 which contains a non-soap, non-surfactant cleaner. A preferred cleaner is one containing citrus acid, and has been found to be especially effective in removing contaminants of the type that tends to accumulate on transport surfaces prior to adhesion of the liner using, for example, an acrylic adhesive. A common cleaner available on the market may be used, such as "Goo-Gone" and "Simple Green". This wiping with the cleaner is done from 2 to 5 times, as shown by arrows B, using about 2 ounces per square foot. This will remove residual oil, wax, dirt and other various contaminants of the type that tend to accummulate on the transport surface. The citrus cleaner is advantageously biodegradable, environmentally safe, and does not present any disposal problem.

Following the cleaning step, as shown in FIG. 9, the chute surfaces 2,3 are rinsed, such as with use of a tool 43, with clean warm tap water or distilled water, for a number of times, such as 2 to 5 times (see arrow C) or until the appearance of the water is clear.

Then, the surfaces are wiped clean and dry from bottom or trailing end to top or leading end using a lint free cloth. Then, the surfaces are allowed to be further dried in air. When the surfaces 2,3 are completely dried, the next step is undertaken.

Figure 10:
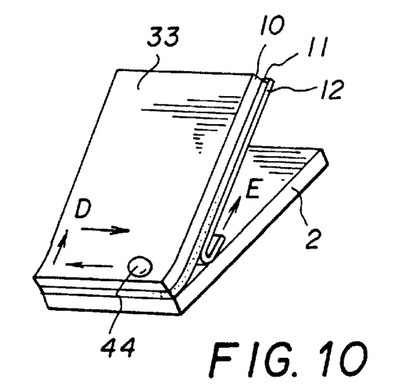
FIG. 10 is a perspective view of the embodiment of FIG. 7 absent the side walls and showing attachment of the skived PTFE film to the surface.

INSTALLATION OF THE LINER (FIG. 10)

The surface on which the PTFE liner (which shall be defined herein as being the skived PTFE film or layer having the adhesive, such as acrylic adhesive, bonded thereto) are first measured.

Figures 13, 14, 15:
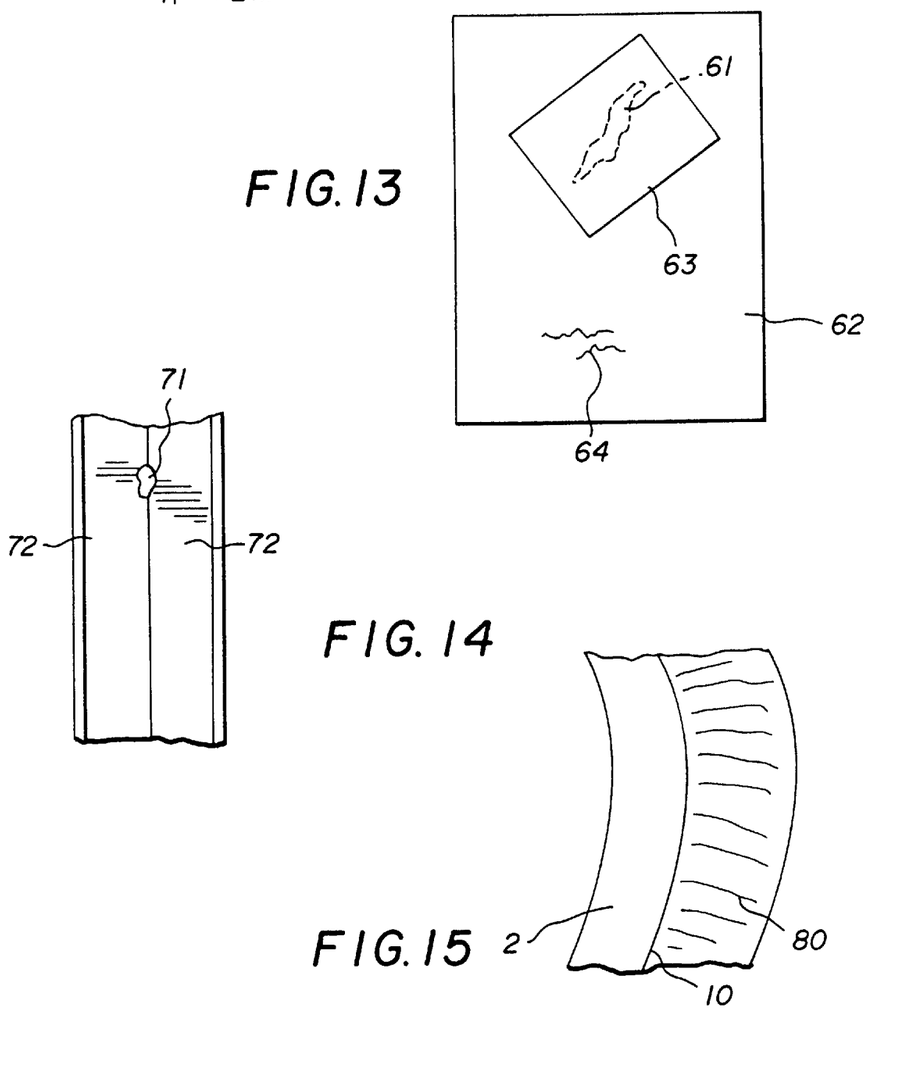
FIG. 13 is a top view depicting a defect in a PTFE liner priorly installed on a substrate and repair thereof using a diamond shaped piece.
FIG. 14 is a top view depicting a "high spot" in the transport substrate and disposition of the PTFE film about the "high spot".
FIG. 15 is a top view depicting a "wear path" created in the transport surface by movement of the packages in a biased direction.

At a minimum, the chute surface areas on which the packages most often moved(which shall be referred to herein as "wear path") should be covered with the PTFE liner. As shown in FIG. 15, the packages will tend to move on surface 2 in a particular pattern, such as shown by shaded part 80, depending on such factors as the shape of the chute, the angle of incline, etc. That is to say, in different chutes there will be a biased pathway in which the packages will tend to travel. This can be detected by visual or other means as will be discussed hereinbelow in greater detail. In FIG. 15, where there is a slight curve, the packages tend to travel outwardly toward the outer circumference thereof. This is referred to as the "wear path" and is illustrated by shaded part 80. At a minimum, the PTFE film 10 should be bonded to such "wear path" 80 of surface 2 with use of adhesive 11.

However, installing the PTFE liner outside of such "wear path" is also advantageous in that the outside area will also tend to carry the packages and use of the PTFE liner thereon will enhance efficiency and help further deter package build-up, bridging, and sticking. Thus, these non-wear path areas should also be measured.

After measurement of the areas to be lined, for areas less than 36 inches in width, a one piece sheet or strip can be suitably cut for placement over the substrate. If the widths are larger, it was found that the strip of PTFE liner can be first cut, for example, to a maximum width of 18 inches for greatest effectiveness of installation, and a plurality of strips then installed to cover the entire width. The lengths would be cut to size as desired. For ease of installation at remote locations, the widths can be standardized, and a plurality of widths installed one next to the other, with the final width being cut to size at the job site to make up the final deficit in width. The cutting will be done with the release liner 12 still attached to the adhesive 11.

The strips, for example of 18 inches width, of the PTFE liner is preferably applied to the substrate with its lengthwise dimension parallel to the direction of travel of the packages thereon. In this manner, the lengthwise edges which are exposed to the packages do not tend to be caught by the corners or edges of the packages. In point of fact, it has been found that such an orientation assists in enabling the PTFE liner to remain firmly attached to the substrate and thus perform its task of preventing build-up of the packages for an extended period of time.

Returning again to a discussion of "wear path", regardless of the material used in the transport surface, it was discovered by the inventors that the packages moved down the chute and tended to travel in certain paths even though the full travel surface was much larger and equally exposed to the packages being moved. For example, in a chute having horizontal and vertical surfaces, the packages theoretically should touch any of the surfaces. But, in practice, the packages tended to, that is there was a bias toward, follow the same "wear path" until there was a build-up, bridging, sticking, etc in which case, the packages then were disposed all over the different surfaces. To visually detect a wear path, for example, with steel chutes, one should look for the shinier parts of the travel surfaces. A more exact determination can be made using a TV or UV camera and placing a trace substance, such as non-organic powder, on the packages and observing where the substance collects using the camera.

Returning to the size of the PTFE liner, it has been found that a 24"×M"×36" sheet can be readily applied without any problems, such as on curves. The "M" dimension is as desired. However, the preferred width is 18". The PTFE liner can be applied full width, i.e. warp/machine direction, or in some cases at specified widths utilizing the travel direction shown by arrow A.

As shown in FIG. 10, after the prior steps of surface preparation, cleaning, rinsing, drying, installation of the PTFE liner 33 was done as follows using the pre-formed skived PTFE film 10 having bonded on a reverse side thereof an acrylic adhesive 11 with a release liner 12 covering the adhesive 11 which PTFE liner 33 and liner 12 were priorly reverse rolled to eliminate any prior bias memory.

The installation was started first at the bottom or trailing end of the chute to be lined. For clarity of description, the side rails 3 are omitted from FIG. 10. It is understood that such side rails 3 maybe a part of the chute 1. The side rails 3 may be first lined with the PTFE liner 33 prior to the lining of substrate 2 with the PTFE Liner 33.

(1) From the acrylic adhesive coated skived PTFE liner 33, the polyethylene release liner 12 is peeled back from the adhesive 11, in the direction shown by arrow E, about 2 to 3 inches for the full width dimension.

(2) Holding the strip 33 straight and square to the installation area of the transport surface 2, the PTFE liner is firmly adhered to this area, such as by hand rubbing using tool 44 which is a smooth hard tool, in a motion, such as shown by arrow D, that is perpendicular to the side edges of the PTFE liner. This will insure removal of any air bubbles that may exist between the PTFE film 10 and the adhesive coated thereon 11 and the substrate 2 to which the adhesive 11 is being adhered.

(3) While pulling back the polyethylene liner 12, the PTFE film 10 is rubbed, such as by use of the hard smooth tool 44, adjacent to the peeled back release liner 12 while the adhesive is caused to become attached to the substrate. After the release liner 12 is peeled back about 3–4 inches, it is important to keep the film and adhesive as close to the substrate as possible while removing the release liner for most efficient, accurate and reliable installation.

(4) With the initial strip of PTFE liner bonded to the substate a second strip may be attached in the same manner, with the lengthwise dimension as close as possible to the priorly laid strip. In this case, the gap between adjacent strips may be closed by burnishing the two adjacent edges with a hard smooth tool. This causes the two adjacent edges to creep toward each other to close the gap.

Another way to install the next strip is to overlap the second strip longitudinally over the first strip with about a one inch overlap. The overlapped portions are then both cut at the center of the overlap. This is shown more clearly in FIG. 12, wherein first strip 50 is first attached in the manner set forth above, and then the second strip 51 is attached adjacent thereto with an overlap of "M" dimension, which is preferably about one inch. The cutting of ½ of M, or in this case ½ inch, is shown by the dotted line in FIG. 12. This is done for the entire length of both strips 50,51. Then, excess material is removed from both strips 50,51. In that manner, the remaining edges of strip 50 and 51 will be closely adjacent to each other with very little gap therebetween. This removal can be done by first removing the upper most cut away piece, and then removing the lower most cut away piece. Then, the entire area, that is edges of both strips and the gap therebetween is thoroughly burnished with use of a smooth hard tool. This will cause the gap distance to be minimal. Also, the entire area may be sandpapered using a preferable 80 grit paper, until the entire area is smoothed with the two edges and gap become a unitary smooth surface which cannot be "caught" easily by any package corner or edge.

Figure 12:
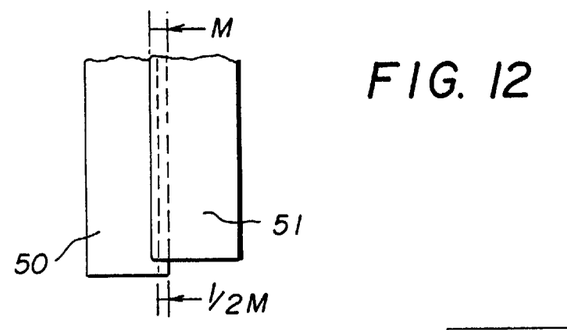
FIG. 12 is a top view depicting two overlapped PTFE films laid on a substrate and showing the overlapping and cutting dimensions.

The ends of strips 50 and 51 are shown slightly offset for clarity of description. In practice the two ends would be of the same dimension. Also, this type of installation, may be used when repairing a priorly installed strip with an adjacent strip.

Thus, a feature of the invention is that after attaching the PTFE liner to the substrate, the exposed edges of the film are burnished with a smooth hard tool and/or sandpapered so that the gap therebetween is minimized and so that the exposed edges of the film will present a gradual smooth incline from one edge to the substrate and not provide any dislocations which might be caught by a package corner or edge. By such procedure, the effective lifetime of the PTFE lined chute is lengthened considerably.

(5) The foregoing steps can be done first on the side rails, as mentioned, and then the transport surfaces lined, or vice versa as desired. As discussed, the foregoing ranges of thicknesses and widths are preferred.

(6) With the flat transport surfaces done, then, the curved areas are lined with the PTFE liner. Of course, the curved area could instead be done first, and then the flat straight areas done thereafter. It has been discovered that a preferred shape for curved surface is to cut a piece which is a truncated cone, with a first dimension at the least top dimension, a second dimension at the widest bottom dimension, and a third dimension between the two top and bottom dimensions. For example, a piece measuring 18"×M"×36" was found to be optimal for use with curved surfaces. Starting immediately to where the flat pieces are installed, the strips are applied beginning at the inside edge. The foregoing procedure is again used beginning adjacent to where the flat piece has been installed. Holding the PTFE strip as straight and square as possible to the top edge, the installation steps are repeated. An entire row of, for example, 18"×24" sheet are applied along a top edge. Then, each succeeding piece is overlapped by one inch and the butted joints are prepared in the manner set forth and described with reference to FIG. 12, and burnished and/or sandpapered, as above discussed. In certain installations, an 18"×24" or 18"×36" sheet is more convenient.

(7) With the first row completed, a second row is then installed in the same manner starting at the same starting point as the first row. There results two butted joints, from piece to piece, which are worked in the same manner as above set forth.

(8) Then, all of the foregoing steps are repeated as suitable. In this manner, the entire surface and side walls and other surfaces are lined with the skived PTFE liner so that packages moved thereon will not be subjected to build-up, bridging, sticking, and the like, and movement will be continuous and uninterrupted.

Turning now to FIG. 14, when a "high spot" cannot be grounded out because of harm to structural integrity or for other reason the "high spot" will first be smoothed. Then, around such "high spot", such as shown in FIG. 14 as number 71, the skived PTFE layers 72 will be attached in the manner as aforementioned. The PTFE layer however will not cover the "high spots". Thus, there is no danger that any air bubbles will exist between the film and substrate at parts next to the "high spots". The "high spots" may be welds, joints, etc. Thus, advantageously, with the invention, the "high spots" are not removed and thereby diminish the integrity of the structure of the chute. Rather, in the invention, the structural integrity is retained while preventing package buildup. We have discovered that use of the skived PTFE liner around the "high spots" was sufficient to prevent build-up and provide continuous package movement.

Another feature of the invention is shown in FIG. 13, wherein a slight tear or gouge or irregularity 61, such as caused by a irregular package may be found later in the installed PTFE liner 62 placed on surface 2. We have discovered that by cutting out the irregularity 61 in a diamond shaped piece 63, and then, replacing the cut away piece with another diamond shaped skived PTFE liner, an almost seamless patch could be laid without any curling at the edges of the replacement patch or previously laid PTFE liner. That is the diamond shape offers no direct horizontal seam (i.e. perpendicular to the travel direction) that may lead to a lifting up of the liner or replacement part therefor. Thus, a repair is made which is just as effective as the original PTFE liner. The diamond shaped patch is typically about 4 to 6 square inches. Larger areas may require a completely new strip of PTFE Liner.

Also, as shown in FIG. 13, there may be scratches 64 in the PTFE liner on top of the substrate. It was discovered by the inventors that by merely sandpapering, such as using 80 grit sandpaper, for example 10 times, the scratches would be reduced by the area of the PTFE film around them being gradually reduced in vertical height so that a smooth surface would result and no exposed or uplifted surfaces would exist to "catch" the packages traveling in the chute.

As discussed above, the invention has overcome the disadvantages, problems and deficiencies in the prior art. Advantageously, the inventors have solved a problem that has plagued the package shipping industry for a long time, and has produced outstanding savings in time, money, effort, manpower, and increased speed of processing, reliability and efficiency. For example, since the invention was introduced, in one plant alone, the savings in Workman's compensation insurance rate has been substantial because the worker no longer had to shut down his regular work and climb up to dislodge the bridged packages. Previously, the worker inevitably fell and leas injured. Also, priorly, the flow of packages was "touch and go". It was never continuous. With the installation of the instant invention, the speed of processing has been increased by a substantial amount. In some cases, the speed of processing has increased by 100%. Also, because the packages can now move unhindered, it is now possible to reduce the size of the chutes and/or increase the number of packages which are processed in the same line. This reduces costs substantially. Also, previously graphite and/or wax was used. This would be transferred to and contaminate associated conveyor belts, which then required replacement. The cost of replacement belts is substantial. Now, since the installation of the invention, such conveyor belts need not be periodically replaced due to contamination.

The foregoing is illustrative of the principles of the invention. Numerous extensions and modifications thereof would be apparent to the workers skilled in the art. All such extensions and modifications are to be considered to be within the spirit and scope of the invention.

What is claimed is:

1. An apparatus for supporting and facilitating movement from one point to another of a plurality of packages being acted upon by an external force, said apparatus comprising:

a stationary transport substrate configured for supporting and slidably conveying packages thereon;

a skived PTFE film permanently attached to said stationary transport substrate; and an adhesive intimately bonded to said PTFE film over an entire surface of one side of said film, said adhesive serving to attach said PTFE film to said transport substrate, an opposite side of the skived PTFE film forming a lubricious transport surface for the plurality of packages.

2. The apparatus of claim 1, wherein said skived PTFE film is capable of being abraded 50 to 60% without loss of effectiveness as a lubricious non-stick transport surface.

3. The apparatus of claim 1, wherein said transport substrate comprises a material selected from the group consisting of steel, aluminum, wood, wood composition, plastic and fiberglass.

4. The apparatus of claim 1, wherein said transport substrate is inclined so that said plurality of packages are moved downward on said transport surface formed by said skived PTFE film by force of gravity.

5. The apparatus of claim 1, wherein said skived PTFE film is installed on said stationary transport substrate only in wear paths produced by movement of said packages.

6. The apparatus of claim 1, wherein said skived PTFE film is of a thickness ranging from 5.0 to 15 mils, and the adhesive is acrylic adhesive and of a thickness ranging from 0.5 to 5.0 mils.

7. The apparatus of claim 6, wherein said skived PTFE film has a thickness of 10 mils and a tension break point of 200%, and the acrylic adhesive has a thickness of 2.0 mils, and an operating temperature is between −40° to +350° F.

8. The apparatus of claim 1, wherein said skived PTFE film comprises a filler.

9. The apparatus of claim 8, wherein said filler comprises carbon in a range of 0.1 to 1.0 percent by weight of the PTFE film.

10. The apparatus of claim 1, wherein said transport substrate comprises a first substantially flat or textured surface and at least one second surface disposed at an edge of said first surface and at generally a right angle thereto; and wherein said first surface and said at least one second surface are lined at least over wear paths thereon with said skived PTFE film.

11. The apparatus of claim 10, wherein said first surface is disposed downardly in an incline and has a spiral or curved shape.

12. The apparatus of claim 1, wherein said skived PTFE film has said adhesive pre-formed on and bonded to a prepared surface of said one side of said film.

13. The apparatus of claim 12, wherein said adhesive comprises a pressure sensitive adhesive, and the skived PTFE film with said pre-formed adhesive is attached to said substrate through the application of pressure to said opposite side of said film.

14. The apparatus of claim 1, wherein said skived PTFE film comprises a plurality of strips disposed with a lengthwise dimension thereof in a direction parallel with direction of travel of said plurality of packages on said transport surface.

15. The apparatus of claim 1, wherein said adhesive comprises a pressure sensitive adhesive, and the skived PTFE film is attached to said substrate through the application of pressure to said opposite side of said film.

16. An apparatus for supporting and facilitating movement of packages in a travel direction, said apparatus comprising:
a transport substrate configured for supporting and slidably conveying packages thereon; and
a skived PTFE film attached to said substrate with an adhesive bonded to one side of said film and to said substrate, said film having a thickness of between 5 to 15 mils and said adhesive being an acrylic adhesive of a thickness of between 0.5 to 5.0 mils, wherein the acrylic adhesive covers an entire surface of said one side of the skived PTFE film attached to said substrate.

17. The apparatus of claim 16, wherein said skived PTFE film comprises a plurality of strips having a range of widths of 5 to 38 inches with the strips being attached so that the lengthwise dimension is disposed to be parallel to the direction of travel of the packages, and wherein portions of adjacent edges are sanded to reduce the vertical dimension thereof gradually and produce a smooth surface between the edges and a gap therebetween, thereby to prevent catching of edges by said packages.

18. The apparatus of claim 16, wherein said substrate has high spots thereon, and wherein said skived PTFE film is located in areas around the high spots so that the high spots will be exposed and the skived PTFE film therearound being effective to prevent package build-up.

19. The apparatus of claim 16, wherein said skived PTFE film comprises a portion that is diamond shaped and is disposed in an area of the substrate where a patching is required.

20. The apparatus of claim 16, wherein said one side of said skived PTFE film has a carbonized surface which provides cross linking with the adhesive and thereby enables an intimate bonding therebetween.

21. The apparatus of claim 16, wherein said skived PTFE film comprises two strips attached to said transport substrate adjacent to each other with a gap therebetween, said gap being minimized by burnishing the adjacent edges of said film with a solid smooth surface so that the edges of said adjacent strips of said film are moved closer to each other and the gap is minimized.

22. The apparatus of claim 16, wherein said skived PTFE film comprises two strips which are overlapped a set distance on top of each other, and then each is cut by one half of that distance so that two adjacent edges of said two strips will have a gap therebetween, and the edges and exposed surface within the gap are sanded to smooth the edges.

23. The apparatus of claim 16, wherein said skived PTFE film is attached to said substrate only in wear paths created by said packages.

24. The apparatus of claim 16, wherein said adhesive comprises a pressure sensitive adhesive, and the skived PTFE film is attached to said substrate through the application of pressure to said opposite side of said film.

25. The apparatus of claim 16, wherein said skived PTFE film has said adhesive pre-formed on and bonded to a prepared surface of said one side of said film.

26. The apparatus of claim 16, wherein said skived PTFE film comprises a carbon filler so as to control static electricity generated by movement of said packages.

27. The apparatus of claim 26, wherein said carbon filler comprises 0.5% by weight of the skived PTFE film.

28. A chute for facilitating transport of packages, comprising:
a transport substrate configured for supporting and slidably conveying packages thereon;
a skived PTFE film;
a pressure sensitive adhesive layer pre-formed over an entire surface of one side of said skived PTFE film attaching said PTFE film to said transport substrate; and
an opposite side of said skived PTFE film providing a lubricious transport surface for said packages.

29. The chute of claim 28, wherein said adhesive comprises an acrylic adhesive.

30. The chute of claim 29, further comprising a release layer covering said adhesive prior to attachment of said film to said transport substrate.

* * * * *